United States Patent [19]

Mathais et al.

[11] 4,081,459

[45] Mar. 28, 1978

[54] TRIOXA-1, 5, 7 SPIRO [2,5] OCTANES AND THEIR METHOD OF PREPARATION

[75] Inventors: Henri Mathais, Sainte Foy les Lyon; Francis Weiss, Pierre-Benite, both of France

[73] Assignee: Produits Chimiques Ugine Kuhlmann, Paris, France

[21] Appl. No.: 671,041

[22] Filed: Mar. 29, 1976

Related U.S. Application Data

[63] Continuation of Ser. No. 88,508, Nov. 10, 1970, abandoned.

[30] Foreign Application Priority Data

Nov. 14, 1969 France .............................. 6939212

[51] Int. Cl.$^2$ ............................................ C07D 319/04
[52] U.S. Cl. .............................. 260/340.7; 260/2 EP; 260/45.8 A
[58] Field of Search ...................................... 260/340.7

[56] References Cited

FOREIGN PATENT DOCUMENTS 2,247,030  4/1973  Germany ........................ 260/340.7

OTHER PUBLICATIONS

Newman et al., J. Org. Chem., vol. 35, No. 9, 1970, pp. 3186–3188.
Chem. Abstracts 77:P102402g.
Chem. Abstracts 79:P18727h.

*Primary Examiner*—Ethel G. Love
*Attorney, Agent, or Firm*—Pennie & Edmonds

[57] ABSTRACT

New compounds comprising trioxa-1, 5, 7 spiro [2.5] octanes and bis(trioxa-1, 5, 7 spiro [2.5] octanes) and the process of preparing the compounds by reacting methylene-5 dioxanes-1, 3 and bis(methylene-5 dioxanes-1,3) respectively, with an epoxidation agent such as an organic peracid which can be used, for example, as non-reactive or reactive solvents for epoxy resin, in the preparation of thermosetting resins and for stabilizing polyvinylchloride.

9 Claims, No Drawings

TRIOXA-1, 5, 7 SPIRO [2,5] OCTANES AND THEIR METHOD OF PREPARATION

This is a continuation of application Ser. No. 88,508 filed Nov. 10, 1970, now abandoned.

SUMMARY OF THE INVENTION

Trioxa-1, 5, 7 spiro [2.5] octanes conforming to formula (I):

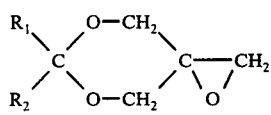

or bis(trioxa-1, 5, 7 spiro [2.5] octanes) conforming to formula (II):

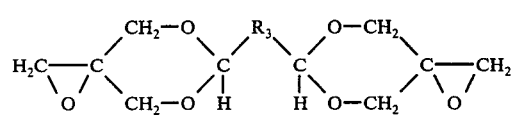

wherein $R_1$ and/or $R_2$ is a hydrogen atom, an alkyl group having from one to 18 carbon atoms, a cycloalkyl or arylalkyl group having from 3 to 18 carbon atoms, an aryl group, a heterocyclic group or $R^1$ and/or $R^2$ represent the above groups containing one or more epoxidizable double bonds, non-epoxidizable double bonds, epoxide groups, epoxidation stable substituents or mixtures thereof or $R_1$ and $R_2$ together is a divalent alkylene group having from 3 to 14 carbon atoms and $R^3$ is a divalent alkylene group of 1 to 12 carbon atoms, a phenylene group or a bond, are formed by reacting a peroxidation agent such as an organic peracid which may be preformed or formed in situ with the corresponding methylene-5 dioxanes-1, 3 conforming to formula (III)

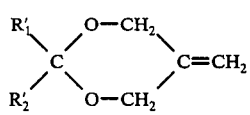

or the bis(methylene-5 dioxanes-1, 3) conforming to formula (IV):

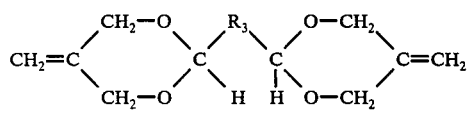

wherein $R_1'$ and/or $R_2'$ is a hydrogen atom, an alkyl group, a cycloalkyl or arylalkyl group having from 3 to 18 carbons, an aryl group, a heterocyclic group, or $R_1'$ and/or $R_2'$ represent the above groups containing one or more epoxidizable double bonds, non-epoxidizable double bonds, epoxidation stable subtituents or mixtures thereof or $R_1$ and $R_2$ together is a divalent alkylene group having 3 to 14 carbon atoms and $R^3$ is a divalent alkylene group of 1 to 12 carbon atoms, a phenylene group or a bond.

Moreover, when it is desired to have $R_1$, $R_2$, $R_1'$ or $R_2'$ contain a heterocyclic group, it is especially advantageous for said group to be a five or six membered ring and the heteroatom to be oxygen or nitrogen and when it is desired to have $R_1$, $R_2$, $R_1'$ or $R_2'$ contain an epoxidation stable substituent, it is especially advantageous for said substituent to be a halogen atom such as bromine or chlorine or an alkoxy or cyclic acetal group.

When $R_1'$ or $R_2'$ contain unsaturated bonds subject to epoxidation, the epoxidation may be partial or complete.

The methylene-5 dioxanes-1, 3 compounds of formula (III) are formed from the reaction of an aldehyde of the formula $R_1'$—CHO or a ketone of the formula $R_1'$—CO—$R_2'$ with methylene-2 propanediol-1, 3 according to the reactions:

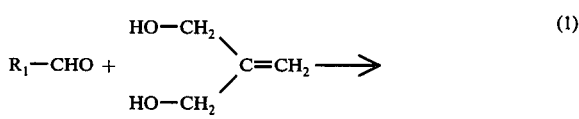

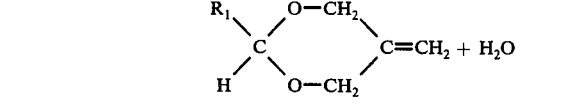

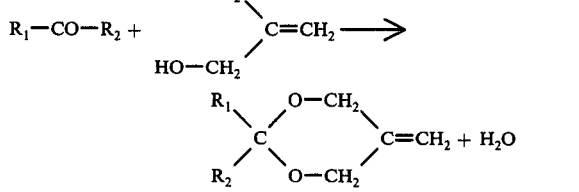

Among the aldehydes which may advantageously be employed are included formaldehyde, acetaldehyde, propionaldehyde, butyraldehyde, isobutyraldehyde, valeraldehyde, isovaleraldehyde, oenanthaldehyde, ethyl-2 hexanal, cyclopentane carbaldehyde, cyclohexanecarbaldehyde and its methyl substituted derivatives, norbornane carbaldehyde-2, cyclododecanecarbaldehyde, phenyacetaldehyde, benzaldehyde, para-tolualdehyde, naphthalene-1-acetaldehyde, tetrahydrofurfural, tetrahydropyran-2-carbaldehyde, nicotinaldehyde, chloroacetaldehyde, chloral, para-chlorobenzaldehyde, piperonal, methoxyacetaldehyde, methoxy-3 propionaldehyde, acrolein, crotonaldehyde, ethyl-2 hexene-2al, cyclohexene-3 carbaldehyde, methyl-4-cyclohexene-3 carbaldehyde, norbornene-5 carbaldehyde-2 and methyl-3 norbornene-5 carbaldehyde-2.

Among the ketones which may be advantageously employed are included acetone, methylethylketone, methylisobutylketone, acetophenone, cyclobutanone, cyclopentanone, cyclohexanone, methylcyclohexanone, cyclooctanone, cyclododecanone, methyl vinyl ketone, methylisopropenylketone, mesityl oxide, cyclohexene-2 one, isophorone and cyclododecadiene-5, 9 one.

The bis(methylene-5 dioxanes-1, 3) compounds of formula (IV) are formed from the reaction of a dialdehyde of the formula OHC—$R_3$—CHO according to the reaction:

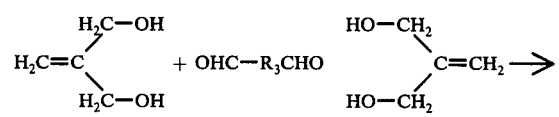

-continued

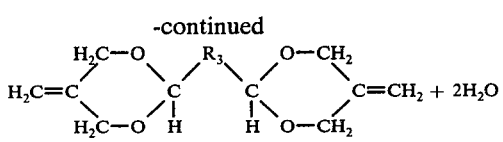

Among the dialdehydes which may advantageously be employed are included glyoxal, malonaldehyde, succinaldehyde, glutaraldehyde, adipaldehyde, phthalaldehyde, isophthalaldehyde and terephthalaldehyde.

The monoepoxides of formula (I) may be advantageously employed in epoxy resin-curing systems as a reactive or non-reactive diluent. Since the viscosity of many uncured epoxy resins is too high for application requiring at or near room temperature processing conditions, the use of such a diluent becomes necessary. The monoepoxides of type (I) compounds react with the epoxy resin curing agent and since they contain only one epoxy group, their functionality is less than the epoxy resin and thus they serve as chain-stopping elements which results in reduced crosslinking density.

Homopolymerization of monoepoxides of type (I) compounds yield polycyclic acetal resins.

The diepoxides or polyepoxides of (I) or (II) are useful for the manufacture of thermosetting resins which may be incorporated into varnishes, adhesives and other coatings. These diepoxides and polyepoxides can be used to form thermosetting resins in the same manner as other diepoxides and polyepoxides such as diglycidyl ether of bisphenol A as described in the prior art and can be used for the same purposes.

The diepoxides and polyepoxides of (I) and (II) are also advantageous and particularly effective as stabilizing agents for polyvinylchloride.

DESCRIPTION OF THE PREFERRED EMBODIMENT

To prepare the trioxa-1, 5, 7 spiro [2.5] octane compounds of this invention, the formula (III) or (IV) compounds as defined in the Summary of the Invention are reacted with a known epoxidation agent. Organic peracids, such as performic acid, peracetic acid, perbenzoic acid or substituted derivatives such as p-nitroperbenzoic acid or m-chloroperbenzoic acid, monopersuccinic acid, monopermaleic acid, monoperphthalic acid or a peroxycarboximidic acid are particularly advantageous epoxidation agents. A peroxycarboximidic acid is preferably used, and is prepared by the reaction of hydrogen peroxide with a nitrile. The preferred method comprises preparing the epoxidation agent in the reactive medium by progressively adding an aqueous solution of hydrogen peroxide to a mixture of the nitrile and the formula (III) or (IV) compound which is to be epoxidized. The nitrile is selected from among alkyl, cycloalkyl or aryl nitriles not having any substituent groups which can react with any of the components of the reaction medium. It is especially advantageous to use alkyl or cycloalkyl nitriles having 2 to 8 carbon atoms, preferably acetonitrile, or a benzenic nitrile, preferably benzonitrile.

Hydrogen peroxide is preferably used in stoichiometric quantity or in a slight excess, an excess of about 1 to 2 moles $H_2O_2$ per equivalent of unsaturated ethylenic compound being especially advantageous. $H_2O_2$ can be used as a 30–90% by weight of $H_2O_2$ aqueous solution, as this is the solution which is commercially available.

The nitrile is used in a quantity at least stoichiometric in relation to $H_2O_2$, or in excess, at about 1 to 10 moles per mole of $H_2O_2$.

Carrying out the reaction in the presence of a solvent for the reaction ingredients is advantageous in order to facilitate homogenization of the mixture. This solvent is advantageously selected from among the aliphatic monohydric alcohols having 1 to 4 carbon atoms, as, for example, methanol, ethanol, n-propanol, isopropanol, n-butanol, sec-butanol, isobutanol, t-butanol. The invention is not limited to these particular solvents, however, since other solvents could be used as will be apparent to those skilled in the art.

The reaction requires control of the pH of the medium, which should be maintained at a value between 8 and 10 by addition of a base during the reaction, in order to neutralize the acid by-products as they are formed. For this purpose one can use sodium- or potassium-hydroxides, sodium- or potassium-carbonate, lime, ammonia, etc., which may be added as an aqueous solution. It may be desirable to buffer the reaction medium which may be advantageously carried out by adding a mono-, di- or trisodium phosphate, for example.

The optimal temperature of the reaction is between 20° and 100° C., advantageously between 40° and 75° C., but the temperature range can vary beyond these limits.

The duration of the reaction can vary widely, according to nature of the reagents and other process conditions, but is generally completed in a few hours.

After the reaction, the epoxidized product can be isolated by extraction with an extraction solvent which is insoluble or only slightly soluble in the reaction medium. Or it may be advantageous to have previously separated both the excess nitrile and the solvent employed for the reaction by means of fractional distillation, in which case, the epoxide can be recovered by simple decantation from the aqueous medium.

If the solvent extraction method is used, various extraction solvents can be used including aliphatic, cycloaliphatic or benzenic hydrocarbons having 5 to 8 carbon atoms, or chlorinated solvents having 1 to 6 carbon atoms, such as methylene chloride, chloroform, carbon tetrachloride, tetrachloroethylene and o-dichlorobenzene, and so forth, as will be apparent to those skilled in the art.

EXAMPLE 1

Isopropyl-6 trioxa-1, 5, 7 spiro [2.5] octane

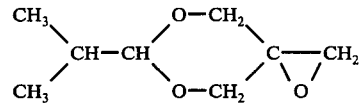

143 g. isopropyl-2 methylene-5 dioxane-1, 3 (1 mole) were dissolved in 160 g. methanol and 82 g. acetonitrile (2 moles), to which was also added 10 cu. cm. of an aqueous molar solution of monosodium phosphate. 73 g. of a 70% by weight aqueous solution of hydrogen peroxide (1.5 mole $H_2O_2$) were then gradually added over a period of 3 hours while maintaining the temperature at about 60° C. The pH was maintained at 9.0 by the addition of a 10% by weight solution of NaOH. The temperature and pH were kept constant for 2 hours.

The solvents were then removed by distillation under reduced pressure, and the remaining mixture treated with chloroform, first with 280 g., then twice wth 70 g. The chloroform extracts were decanted, and then collected and washed twice with 70 g. of water.

The chloroform was then evaporated, and 146 g. of a substance was obtained which analysis showed as containing 92% isopropyl-6 trioxa-1, 5, 7 spiro [2.5] octane. By distillation under reduced pressure, the trioxa compound of 96–97% purity (determined by chemical analysis and gas phase chromatography) was obtained, the characteristics of which were the following:

Eb$_5$: 90° C.
F: 52° C.

EXAMPLE 2

(epoxy-3, 4 cyclohexyl) -6 trioxa-1, 5, 7 spiro [2.5] octane

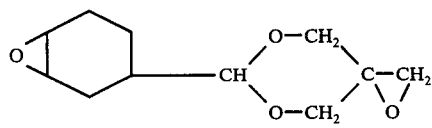

63 g. (cyclohexene-3 yl)-2 methylene-5 dioxane-1.3 (0.35 mole) were dissolved in 224 g. methanol and 115 g. acetonitrile (2.8 moles), and 5 cu. cm. of an aqueous molar solution of monosodium phosphate were then added. 51 g. of a 70% by weight aqueous solution of hydrogen peroxide (1.05 mole H$_2$O$_2$) were then gradually added thereto over a period of 2 hours while maintaining the temperature at about 60° C. The pH was maintained at 9.0 by adding a 10% solution by weight of NaOH. The temperature and pH were kept constant for 3 hours.

The mixture was then treated as described in Example 1, and 64 g. of a crystallized substance were obtained having a melting point of 32° C. and analyzed as containing 77% of (epoxy-3, 4 cyclohexyl)-6 trioxa-1, 5, 7 spiro [2.5] octane and 22% of monoepoxidized derivatives.

EXAMPLE 3

(epoxy- 5, 6 norbornyl-2)-6 trioxa-1, 5, 7 spiro [2.5] octane

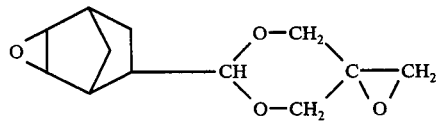

67.2 g. (norbornene-5 yl-2)-2methylene-5 dioxane 1, 3 (Eb$_1$: 70°–73°; n$_D^{20}$: 1.504; d$_4^{20}$: 1.0698) (0.35 mole) were dissolved in 224 g. methanol and 115 g. acetonitrile (2.8 moles), and 5 cu. cm. of an aqueous molar solution of monosodium phosphate were then added. 51 g. of a 70% by weight aqueous solution of hydrogen peroxide (1.05 mole H$_2$O$_2$) were then gradually added over a period of 2 hours while maintaining the temperature at about 60° C. The pH was maintained at 9.0 by adding a 10% by weight solution of NaOH. The temperature and pH were kept constant for 3 hours.

The mixture was then treated as described in Example 1, and 68.9 g. of an extremely viscous, colorless substance, n$_D^{45}$: 1.505, containing about 75% of the diepoxide (epoxy-5, 6, norbornyl-2)-6 trioxa-1, 5, 7 spiro [2.5] octane, and 25% monoepoxides, resulting from partial epoxidation of the starting compound were recovered.

EXAMPLE 4

(epoxy-1, 2 ethyl)-6 trioxa-1, 5, 7 spiro [2.5] octane

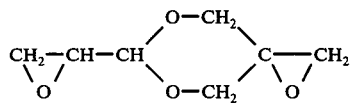

62 g. vinyl-2 methylene-5 dioxane-1, 3 (0.5 mole) were dissolved in 400 g. methanol and 205 g. actonitrile (5 moles), and 14.5 cu. cm. of an aqueous molar solution of monosodium phosphate were added. 170 g. of a 40% aqueous solution of hydrogen peroxide (2 moles H$_2$O$_2$) were then gradually added thereto over a period of 2 hours while maintaining the temperature at about 60° C. The pH was maintained at 9.2 by adding a 10% solution by weight of NaOH. The temperature and pH were kept constant for one hour.

The mixture was then treated as described in Example 1, and 48 g. of a colorless, viscous liquid, titrating 1.11 oxirane equivalents per 100 g. were recovered. The theoretical number of equivalents calculated for (epoxy-1, 2 ethyl)-6 trioxa-1, 5, 7 spiro [2.5] octane is 1.26 oxirane equivalents per 100 g.

The other compounds coming within the scope of this invention as described above as formulas I and II can be prepared in the same manner as set forth in the above Examples by a simple selection of the appropriate starting materials as set forth in formulas III and IV, for example,

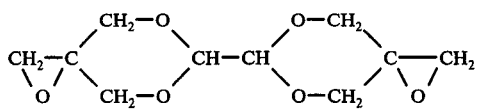

can be prepared by substituting

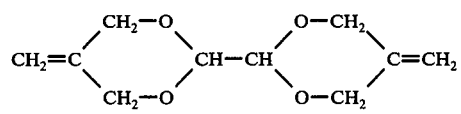

for the dioxanes of the above Examples and

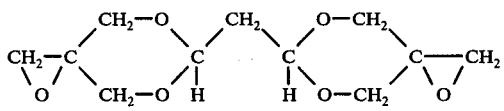

can be prepared by substituting

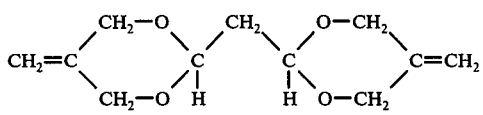

for the dioxanes in the above Examples etc.

We claim:

1. Trioxa-1, 5, 7 spiro [2.5] conforming to formula (I):

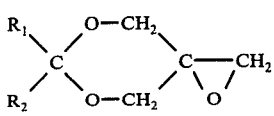
(I)

and bis(trioxa-1, 5, 7 spiro [2.5] octanes) conforming to formula (II):

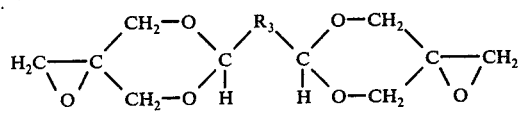
(II)

wherein $R_1$ and/or $R_2$ is a hydrogen atom, an alkyl group having from 1 to 18 carbon atoms and a cycloalkyl having from 3 to 18 carbons and $R_3$ is an alkylene group of 1 to 12 carbon atoms, a phenylene group or a bond.

2. Trioxa-1, 5, 7 spiro [2.5] octanes conforming to formula (I):

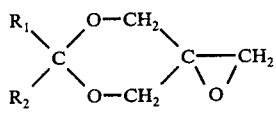
(I)

wherein one of $R_1$ or $R_2$ is hydrogen and the other is hydrogen, methyl, ethyl, propyl, isopropyl, butyl, isobutyl, hexyl, heptyl, cyclopentyl, cyclohexyl, methylcyclo-hexyl, norbornyl, cyclododecanyl, benzyl, phenyl, para-methyl-phenyl, naphthyl, 2-tetrahydrofuranyl, 2-tetrahydropyranyl, 3-pyridyl, chloromethyl, trichloromethyl, parachlorophenyl, methylenedioxyphenyl, methoxymethyl, methoxyethyl, vinyl, 1-propenyl, 3-$\Delta^3$-heptenyl, $\Delta^3$-cyclohexenyl, 4-methyl-$\Delta^3$-cyclohexenyl, 5-norbornene-2yl and 3-methyl-5-norbornene-2yl.

3. Trioxa-1, 5, 7 spiro [2.5] octanes conforming to formula (I):

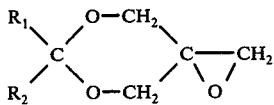
(I)

wherein $R_1$ is methyl and $R_2$ is methyl, ethyl, isobutyl, phenyl, vinyl, isopropenyl, and 2-methyl-isopropenyl.

4. Trioxa-1, 5, 7 spiro [2.5] octanes conforming to formula (I):

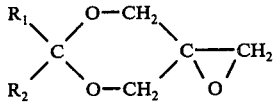
(I)

wherein $R_1$ and $R_2$ together are propylene, butylene, pentylene, methyl-pentylene, heptylene, undecylene, 1-pentylene, and 4,9-undecadienylene.

5. Trioxa-1, 5, 7 spiro [2.5] octanes conforming to formula (I):

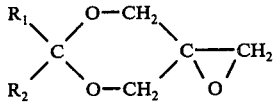
(I)

wherein $R_1$ and $R_2$ are 2-methyl-1-isopropenyl.

6. The compound isopropyl-6 trioxa-1, 5, 7 spiro [2.5] octane.

7. The compound 2-(epoxy-3, 4 cyclohexyl)-6 trioxa-1, 5, 7 spiro [2.5] octane.

8. The compound 3-(epoxy-5, 6 norbornyl-2)-6 trioxa-1, 5, 7 spiro [2.5] octane.

9. The compound 4-(epoxy-1 2 ethyl)-6 trioxa-1, 5, 7 [2.5] octane.

* * * * *